United States Patent [19]

Shinkai et al.

[11] Patent Number: 4,459,612

[45] Date of Patent: Jul. 10, 1984

[54] VERTICAL SYNCHRONIZING SIGNAL DETECTING CIRCUIT

[75] Inventors: Mitsutoshi Shinkai, Tokyo; Masaaki Sakai, Atsugi; Kenji Nakano, Yokohama; Tadahiko Nakamura, Ayase, all of Japan

[73] Assignee: Sony Corporation, Tokyo, Japan

[21] Appl. No.: 418,069

[22] Filed: Sep. 14, 1982

Related U.S. Application Data

[63] Continuation of Ser. No. 220,269, Dec. 29, 1980, abandoned.

[30] Foreign Application Priority Data

Dec. 29, 1979 [JP] Japan .................................. 54-171742
Dec. 29, 1979 [JP] Japan .................................. 54-171743

[51] Int. Cl.³ ............................................ H04N 5/10
[52] U.S. Cl. ................................................. 358/154
[58] Field of Search ............... 358/149, 150, 153, 154, 358/155, 21 R, 319

[56] References Cited

U.S. PATENT DOCUMENTS

| | | | |
|---|---|---|---|
| 3,962,540 | 6/1976 | Kokado | 358/154 |
| 4,214,270 | 7/1980 | Morito | 358/184 |
| 4,227,214 | 10/1980 | Morito et al. | 358/154 |
| 4,238,770 | 12/1980 | Kobayashi et al. | 358/154 |
| 4,291,335 | 9/1981 | Nakagawa et al. | 358/154 |
| 4,357,630 | 11/1982 | Odaka | 358/154 |

FOREIGN PATENT DOCUMENTS

53-138229 12/1978 Japan .................................. 358/154

Primary Examiner—Tommy P. Chin
Attorney, Agent, or Firm—Hill, Van Santen, Steadman & Simpson

[57] ABSTRACT

Digitally designed vertical synchronizing separator and framing circuit in association with a digital servo LSI for a video tape recorder are particularly designed to be noise-free system for a composite synchronizing signal reproduced from the video tape recorder and utilize a reference clock pulse with the synchronizing signal and a counter with a feed back of the contents of the counter to control the supply of said composite synchronizing signal.

6 Claims, 16 Drawing Figures

VERTICAL SYNCHRONIZING SIGNAL DETECTING CIRCUIT

This is a continuation, of application Ser. No. 220,269, filed Dec. 29, 1980, now abandoned.

BACKGROUND OF THE INVENTION

1. Field of the Invention

This invention generally relates in general to a pulse detecting circuit, and more particularly to a digitally designed vertical synchronizing separator circuit, and associated framing detection circuit.

2. Description of the Prior Art

Hitherto, four servo systems, including a drum phase servo system, a drum speed servo system, a capstan phase servo system and a capstan speed servo system have been provided in helical scan type VTR (Video Tape Recorders) using rotary magnetic heads. Generally, an analogue control method is employed for these servo systems. Accordingly, it is difficult to form them as IC (Integrated Circuits). There are some problems due to aging and the temperature characteristics. Therefore, the development of digital control servo circuits is desirable. Some digital servo circuits have already been designed.

In the drum phase servo system and the capstan phase servo system, the vertical synchronizing signal separated from the video signals is used as the reference signal in the recording operation. In the drum phase servo control, the vertical synchronizing signal and the pulse obtained from the pulse generator mounted on the rotary drum are phase compared with each other to produce an error voltage. In the capstan phase servo control, the vertical synchronizing signal and the pulse obtained from the frequency generator mounted on the capstan are phase-compared with each other to produce an error voltage. In the assemble edit operation, the phase servo control of the rotary drum is performed with reference to the vertical synchronizing signal of the external video signals until the magnetic tape has run to the editing point.

In the digital servo circuit, various clock pulses and reference signals are generated by the reference oscillator, which are supplied to the respective circuits constituting the servo systems. The reference oscillator is driven with the subcarrier frequency, and in the recording operation, it is reset with the vertical synchronizing signal.

Usually, the integrating type sync separator is used in the conventional vertical synchronizing separating circuit for separating the vertical synchronizing signal from the video signals. Capacitors are included in the integrating type sync separator which make it difficult to form the vertical synchronizing circuit in ICs. Excessive time is required to adjust the time constant circuit including the capacitor. Some vertical synchronizing separating circuits have been digitally designed. However, the noise in such circuits is excessive in these digital vertical synchronizing separating circuit. Misoperation can occur due to noise. The influence of noise can be somewhat eliminated by the use of a Schmidt circuit which is arranged at the input side of the vertical synchronizing separating circuit. However, it is difficult to eliminate the influence of wide band nosie.

In the framing servo system, it should be discriminated whether the separated vertical synchronizing signal belongs to the odd or the even field. For example, in the assemble edit mode, it should be discriminated whether the video fields at the editing point are odd or even. In such a case, a framing signal with a level which is inverted at every field, is used for the discrimination. The framing signal functions to reset the above-described reference oscillator in the digital servo circuit, for example, during the assemble edit operation.

In the conventional framing circuit for obtaining framing signal, for example, the framing pulse generated every frame and the pulse inverted by the vertical synchronizing signal are phase compared with each other. When the number of times which successively do not coincide with each other reaches the predetermined number N, the above-described pulse is inverted. Monostable multivibrators including capacitor and resistor are used in the framing circuit. Accordingly, it is difficult to form the framing circuit in IC. It takes too much time to adjust the CR elements. Misoperation often occurs due to noise.

SUMMARY OF THE INVENTION

An object of this invention is to provide a digital signal detecting circuit.

Another object of this invention is to provide a novel signal detecting circuit by which synchronizing timing can be obtained from a composite synchronizing signal.

A further object of this invention is to provide a novel signal detecting circuit by which vertical synchronizing timing and framing pulse can be obtained from the composite synchronizing signal reproduced by VTR (Video Tape Recorder).

A noise-free synchronizing-detecting circuit and a framing pulse generator are formed by the signal detecting circuit of this invention.

Various other objects, advantages and features of the present invention will become readily apparent from the ensuing detailed description, and the novel features will be particularly pointed out in the appended claims.

BRIEF DESCRIPTION OF THE DRAWINGS

FIG. 5A to 5J, 6 and FIG. 7 are timing charts of signals at the respective parts of the circuit diagram of FIG. 4.

DESCRIPTION OF THE PREFERRED EMBODIMENTS

An outline of a digital servo circuit according to one embodiment of this invention will be described with reference to FIG. 1 to FIG. 3. This servo circuit is applicable to all kinds of helical scan type video tape records. However, there will be described the case where the servo circuit is applied to a helical scan type video tape recorder of the rotary two-head 180°Ω wrapping type.

Figure 1:
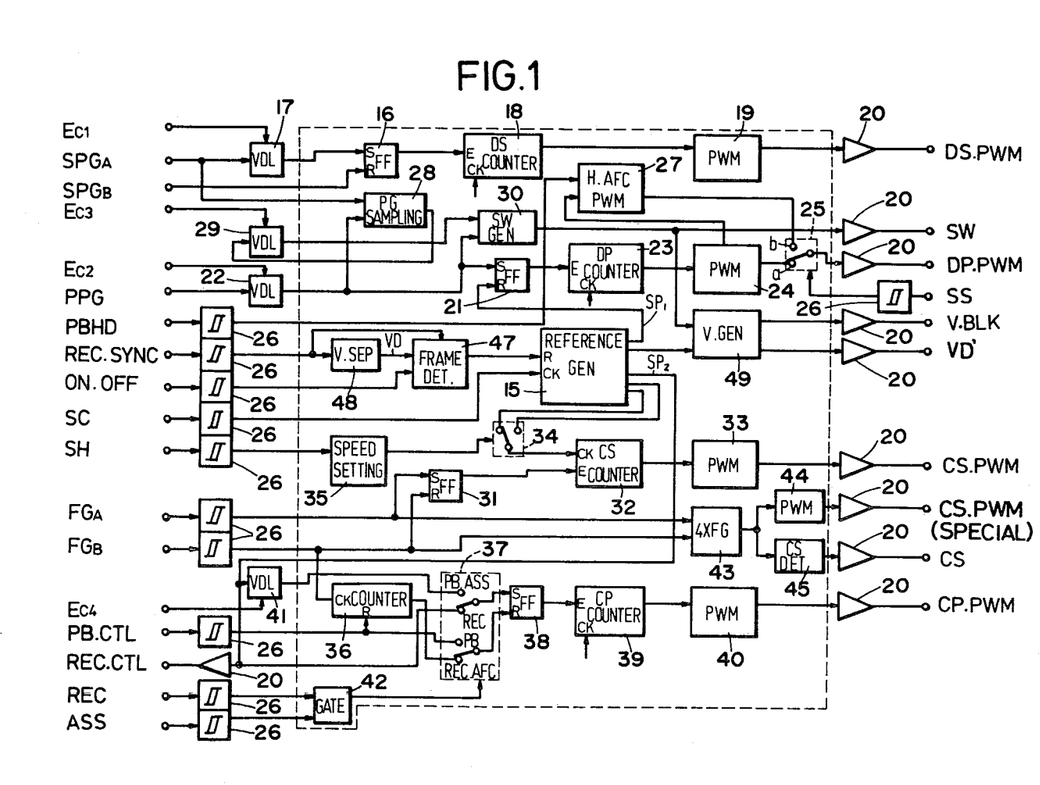
FIG. 1 is a circuit diagram of a digital servo circuit for VTR according to one embodiment of this invention.

FIG. 1 shows a circuit to obtain various error signals for controlling the rotary phases of the rotary drum and capstan, and their rotational speeds. FIG. 2 shows motor drive circuits which are supplied with the error signals from the circuit of FIG. 1. In the servo circuit of this embodiment, a PG (pulse generator) and an FG (frequency generator) are provided in a rotary drum and a capstan so as to detect the rotary phases of the rotary drum and capstan and the rotational speeds thereof.

Figure 2:
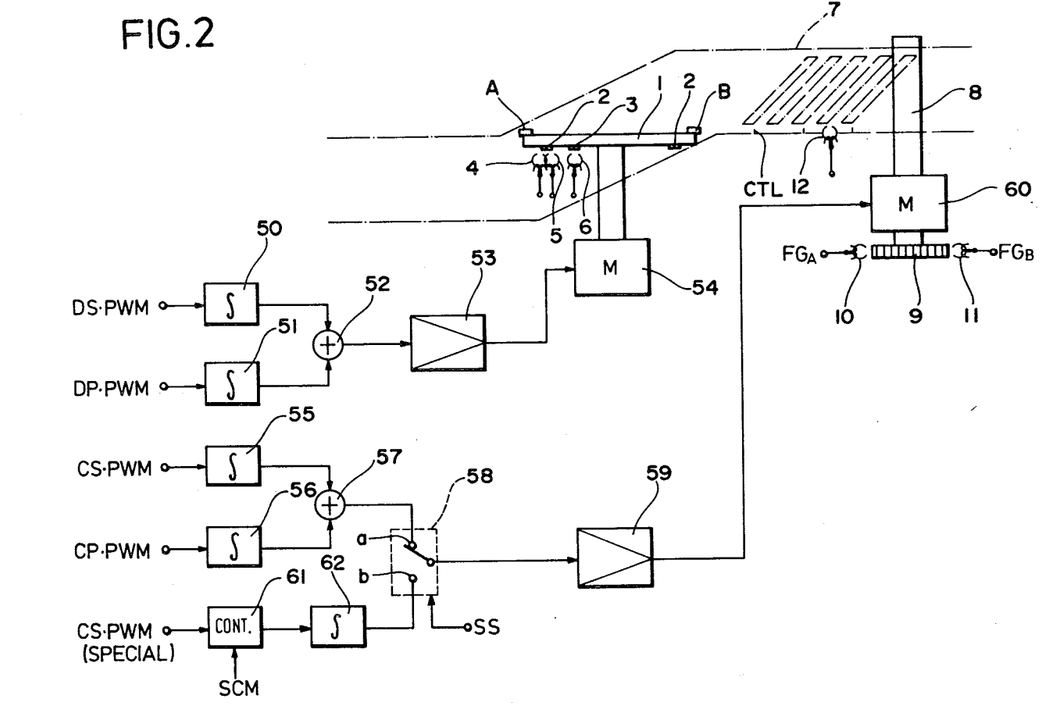
FIG. 2 is a circuit diagram of a motor drive circuit according to the embodiment of this invention.
Figure 3:
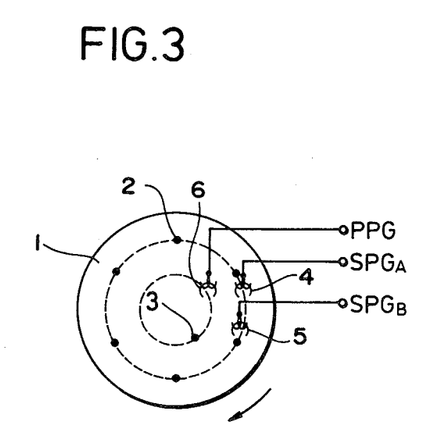
FIG. 3 is a bottom view of a rotary drum in the embodiment of FIG. 2.

In the two-head helical type VTR, the A-head and B head are mounted on a rotary drum 1, as shown in FIG. 2. Six permanent magnets 2 are mounted on the lower surface of the rotary drum 1 at angularly regular intervals (60°). One permanent magnet 3 is arranged on drum 3 within the rotary path of the six permanent magnets 2. Two pick-up heads 4 and 5 are arranged angularly distant by 30° to 40° from each other adjacent to the rotary path of the permanent magnets 2. Another pick-up head 6 is arranged adjacent to the rotary path of the one permanent magnet 3. The above-described PG is constituted by the permanent magnets 2 and 3, and pick-up heads 4 and 5. When the rotary drum 1 rotates, pulse signals $SPG_A$ and $SPG_B$ are generated from the pick-up heads 4 and 5, respectively. Normally, the frequency of the pulse signals $SPG_A$ and $SPG_B$ is 180 Hz. The spacing of the pulses $SPG_A$ and $SPG_B$ represents the rotational speed of the rotary drum 1. A pulse signal PPG is generated from the pick-head 6. Normally, the frequency of the pulse signal PPG is 30 Hz. The pulse signal PPG represents the rotary phase of the rotary drum 1.

A magnetic wheel 9 is fixed to the shaft of a capstan 8 which drives the magnetic tape 7. The circumferential surface of the magnetic wheel 9 is magnetized with numerous N-poles and S-poles. Pick-up heads 10 and 11 are arranged adjacent to the circumferential surface of the magnetic wheel 9. The above-described FG is constituted by the magnetic wheel 9 and pick-up heads 10 and 11. Pulse signals $FG_A$ and $FG_B$ are generated from the pick-up heads 10 and 11, respectively. Normally, the frequency of the pulse signals $FG_A$ and $FG_B$ is, for example, 450 Hz. The spacing of the pulse signals $FG_A$ and $FG_B$ represents the rotational speed of the capstan 8. A CTL signal recorded on a control track of the magnetic tape 7 is detected by a CTL head 12. The CTL signal is used for the phase servo of the capstan 8 in the reproducing mode.

The circuit of FIG. 1 is divided into a digital part indicated by dotted lines and an analogue part, and it is formed on one LSI chip.

The above-described pulse signals $SPG_A$, $SPG_B$, $FG_A$, $FG_B$ and CTL signal from the pick-up heads 4, 5, 10, 11 and 12 are supplied to the circuit of FIG. 1. Clock pulses are counted by counters for measuring the spacings of these signals. Output duty ratios of PWM (Pulse Width Modulation) circuits are controlled with the counted value of the counters. The output of the PWM circuits are led out as the error voltage from the LSI chip. A reference oscillator 15 is arranged for generating the abovedescribed pulses. Clock pulses of various frequencies are generated by the reference oscillator 15, and they are supplied to the above-described counters. In addition to the above-described clock pulses, a reference pulse is generated by the reference oscillator 15. In the recording mode or external synchronization reproduction mode, the reference oscillator 15 is driven in synchronization with a sub-carrier signal SC obtained from a color burst signal of video signals. In the reproducing mode without external synchronization, the reference oscillator 15 self-excited and it oscillates.

In a drum speed servo system of the circuit of FIG. 1, the pulse signal $SPG_A$ is supplied through a variable delay circuit 17 to a flip-flop 16 to set the flip-flop. The pulse signal $SPG_B$ is supplied to the flip-flop 16 to reset it. The width of the output pulse of the flip-flop 16 corresponds to the speed of the rotary drum 1. A DS (Drum Speed) counter 18 is actuated by the output pulse of the flip-flop 16. The clock pulses are counted by the DS counter 18. The counted value of the DS counter 18 is supplied to a PWM circuit 19 to control the output duty ratio of the latter. An error voltage DS.PWM for the drum phase servo is obtained through a buffer amplifier 20 from the PWM circuit 19. A speed adjusting voltage $Ec_1$ is supplied to the variable delay circuit 17 to adjust the delay time for the pulse signal $SPG_A$.

In a drum phase servo system of the circuit of FIG. 1, the pulse signal PPG is supplied through a variable delay circuit 22 to a flip-flop 21 to set the latter. A reference signal $SP_1$ of 30 Hz from the reference oscillator 15 is supplied to the flip flop 21 to reset it. Accordingly, the width of the output pulse of the flip-flop 21 represents the rotary phase of the rotary drum 1. A DP (Drum Phase) counter 23 is actuated by the output pulse of the flip-flop 21. The clock pulses are counted by the DP counter 23. The counted value of the DP counter 23 is supplied to a PWM circuit 24 to control the output duty ratio of circuit 24. An error voltage DP PWM for controlling the drum phase is obtained through a contact a of a switch circuit 25 and a buffer amplifier 20 from the PWM circuit 24. A phase adjusting voltate $Ec_2$ is supplied to the variable delay circuit 22 to adjust the phase of the pulse signal PPG. In special reproducing modes such as slow motion mode, still mode and quick search mode, the switching circuit 25 is changed over to engage a contact b. A change-over signal SS is supplied through a Schmidt circuit 26 to the switching circuit 25 to change over circuit 25 to the contact b. In the special reproducing mode, a horizontal synchronizing signal PB.HD of reproduced video signals is supplied through a Schmidt circuit 26 to an H. AFC PWM circuit 27, and a part of the output of the PWM circuit 24 is supplied thereto, so that the drum speed is controlled and the horizontal synchronizing signal PB.HD is reproduced at regular intervals. Thus, the error voltage DP.PWM is obtained from the H.AFC.PWM circuit 27. In FIG. 1, all of the Schmidt circuits 26 are provided so as to eliminate noise.

The pulse signal PPG is used also for forming a switching signal SW for the heads A and B. For that purpose, the pulse signals $SPG_A$ and PPG are supplied to a PG sampling circuit 28. A nearly central position of the spacing of the pulse signal PPG is detected by the PG sampling circuit 28. The detecting output of the PG sampling circuit 28 is supplied through a variable delay circuit 29 which is adjusted by an adjusting voltage $Ec_3$, to a switching pulse generator 30. The pulse signal PPG is further supplied to the switching pulse generator 30. The predetermined switching signal SW is formed by SW generator 30 on the basis of the pulse signal PPG and the detected central position, and it is supplied also to a vertical synchronizing signal generator 49. A vertical blanking pulse signal VBLK for controlling a signal system in the normal mode and a pseudo vertical synchronizing signal VD' for the special mode are obtained from the vertical synchronizing signal generator 49.

In a capstan speed servo system of the circuit of FIG. 1, the pulse signal $FG_A$ is supplied through the Schmidt circuit 26 to a flip-flop 31 to set it. The pulse signal $FG_B$ is supplied through the Schmidt circuit 26 to the flip-flop 31 to reset it. Accordingly, the width of the output pulse of the flip-flop 31 corresponds to the speed of the capstan 8. A CS (Capstan Speed) counter 32 is actuated by the output pulse of the flip-flop 31. The clock pulse is counted by the CS counter 32. The counted output of the CS counter 32 is supplied to a PWM circuit 33 to control the output duty ratio. An error signal CS.PWM for controlling the capstan speed is obtained through the buffer amplifier 20 from the PWM circuit 33. The frequency of the clock pulses supplied to the CS counter 32 is changed over into one of two frequencies by a switching circuit 34 in accordance with the set speed of the capstan 8 which changes the recording/reproducing time (for example, one-hour recording/reproducing or two-hour recording/reproducing). A speed setting signal SH is supplied through the Schmidt circuit 26 and a speed setting circuit 35 to the switching circuit 34 to change-over the frequency of the clock pulse supplied to the CS counter 32. The speed setting circuit 35 includes fip-flops.

In a capstan phase servo system of the circuit of FIG. 1, the pulse signal $FG_B$ is supplied through the Schmidt circuit 26 to a frequency-dividing counter 36, and the frequency of the pulse signal $FG_B$ is divided to about 30 Hz. The divided pulse signal from the counter 36 is supplied through a contact REC.ASS of a switching circuit 37 to a flip-flop 38 to reset it in the recording mode. Further, a signal $SP_2$ of 30 Hz obtained from the reference generator 15 is supplied through a contact REC of the switching circuit 37 to the flip-flop 38 to set it. The signal $SP_2$ is further supplied as a signal REC.CTL through a buffer amplifier to the control track of the tape where it is recorded thereon. The width of the output pulse of the flip-flop 38 represents the phase of the capstan 8. A CP (Capstan phase) counter 39 is actuated by the output pulse of the flip-flop 38. The clock pulses are counted by the CP counter 39. The counted value of the counter 39 is supplied to a PWM circuit 40 to control the output duty ratio. An error voltage CP. PWM for controlling the capstan phase is obtained through the buffer amplifier 20 from the PWM circuit 40. In the reproducing mode, the signal $SP_2$ is supplied through a variable delay circuit 41 and a contact PB.ASS of the switching circuit 37 to the flip-flop 38 to set it. A signal PB.CTL reproduced from the tape is supplied through a contact PB of the switching circuit 37 to the flip-flop 38 to reset it. The output pulse of the flip-flop 38 is supplied to the CP counter 39 to actuate it. The counted value of the CP counter 39 is supplied to the PWM circuit 40 to control the output duty ratio. The error voltage CP.PWM for the capstan phase control in the reproducing mode is obtained through the buffer amplifier 20 from the PWM circuit 40.

An adjusting voltage $Ec_4$ is supplied to the variable delay circuit 41 to adjust the servo reference position of the signal $SP_2$ from the reference oscillator 15. When a recording mode setting signal REC or an assemble edit mode setting signal ASS to be described hereinafter is supplied through a gate 42 to the switching circuit 37, it is changed over.

Further, the pulse signals $FG_A$ and $FG_B$ are supplied through the Schmidt circuits 26 to a frequency multiplier 43. The frequency of the pulse signals $FG_A$ and $FG_B$ is multiplied there by four. The output of the frequency multiplier 43 is supplied to a PWM circuit 44 and a capstan speed detecting circuit 45. A signal CS.PWM for the special mode is obtained as a capstan speed detecting signal from the PWM circuit 44. A signal CS is obtained from the capstan speed detecting circuit 45 which represents an amplification of the capstan speed.

In the assemble edit mode, the lower movable contact is changed over to a contact REC.ASS from a contact REC.ASS in the switching circuit 37, when an editing point has been located. The frequency-dividing counter 36 is reset with the signal PB.CTL. Thus, the CTL signals and video tracks are orderly combined before and after the editing point of the tape, respectively.

When it is required that the output of the reference oscillator 15 synchronized with even and odd fields of input video signals, the reference oscillator 15 is reset by a frame pulse generated from a frame detecting circuit 47. A composite synchronizing signal REC.SYNC of the input video signals is supplied through the Schmidt circuit 26 to a vertical synchronizing separating circuit 48. The frame detecting circuit 47 which is actuated by an ON.OFF signal, generates the frame pulse on the basis of a vertical synchronizing signal VD from the vertical synchronizing seperator 48.

The above described error voltages are supplied to respective circuits of FIG. 2. The signals DS.PWM and DP.PWM are supplied to integrating circuits 50 and 51, and converted into DC voltages, respectively. They are added to each other in an adder 52. The output of the adder 52 is supplied through a motor drive amplifier 53 to a drum motor 54 to control its phase and speed. The error signals CS.PWM and CP.PWM are supplied to integrating circuits 55 and 56, and converted into DC voltages, respectively. They are added to each other by an adder 57. The output of the adder 57 is supplied through a contact a of a switching circuit 58 and through a motor drive amplifier 59 to a capstan motor 60 to control its phase and speed.

In the special mode, the switching circuit 58 is changed over to a contact a with a signal SS. The error voltage CS.PWM for the special mode is compared with a speed designation signal SCM in a control circuit 61. The compared output of the control circuit 61 is supplied through an integrating circuit 62, the switCching circuit 58 and the motor drive amplifier 59 to the capstan motor 60 to drive it at the designated speed.

Next, examples of the vertical synchronizing signal separating circuit 48 and frame detecting circuit 47 of the present invention will be described with reference to FIG. 4.

Figure 4:
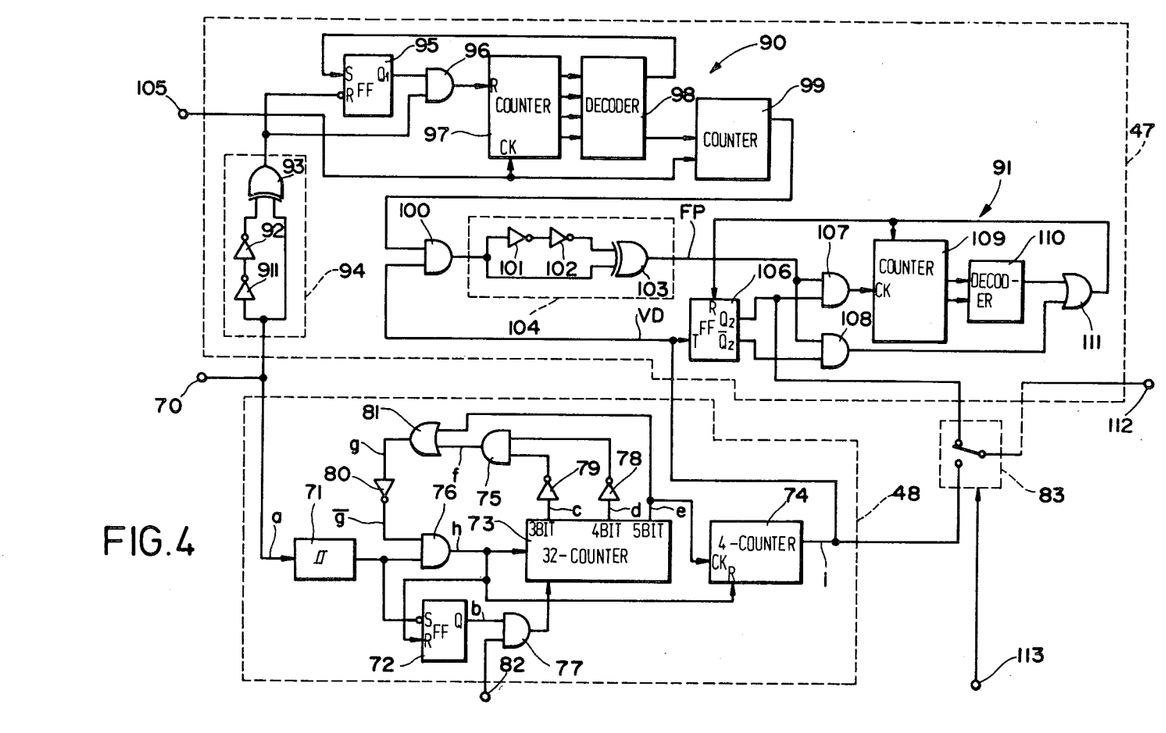
FIG. 4 is a circuit diagram of details of important parts in the embodiment of FIG. 1.

In FIG. 4, the vertical synchronizing separating circuit 48 includes a Schmidt circuit 71, a flip-flop 72, a mod-32 counter 73, a mod-4 counter 74, AND circuits 75, 76, 77, inverters 78, 79, 80, and an OR circuit 81 connected as shown. An input terminal 70 and a clock input terminal 82 are connected to the vertical synchronizing separating circuit 48. Signals a to i at the respective points of the vertical synchronizing separating circuit 48 are shown in FIG. 5A to FIG. 5J.

Figure 5A:
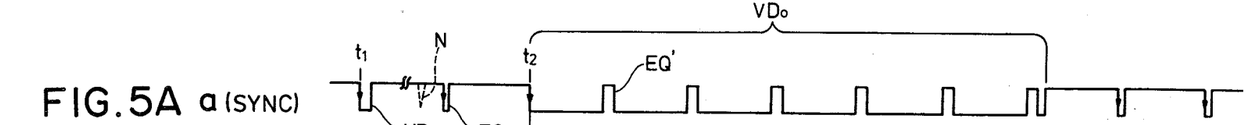
Figure 5B:
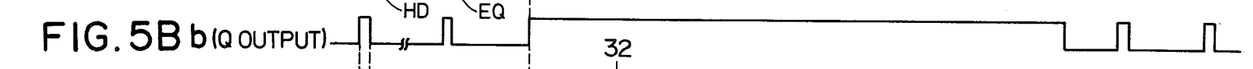
Figures 5C, 5D, 5E, 5F, 5G:
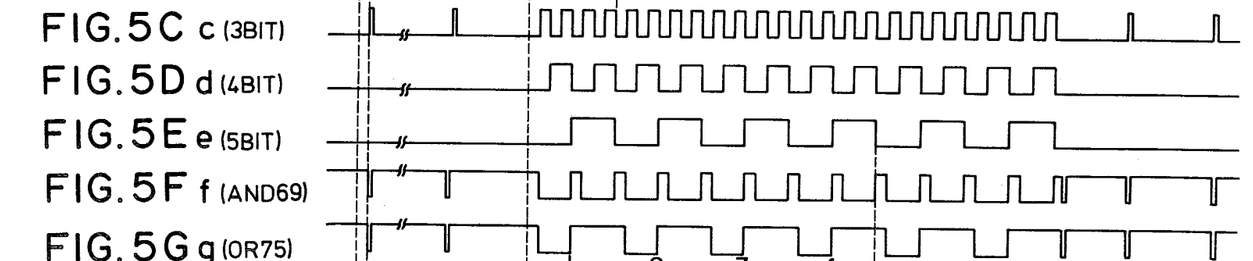
Figures 5H, 5I, 5J:
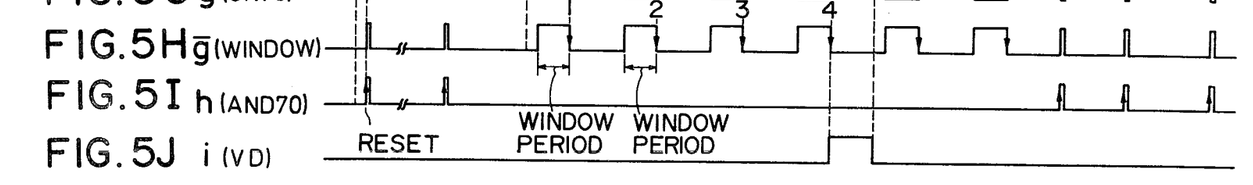

A composite synchronizing signal SYNC as shown in FIG. 5A is supplied to a line a from the input terminal 70. A vertical synchronizing signal VD as shown in FIG. 5J is obtained as the output of the mod-4 counter 74 from a line i. The composite synchronizing signal SYNC includes a horizontal synchronizing signal HD, equalizing pulses EQ and a vertical synchronizing signal VDo. The vertical synchronizing signal VD represents a predetermined position within the period of the vertical synchronizing signal VDo. In this example, a window signal for detecting the vertical synchronizing signal VDo and noise is formed on the basis of the time when the composite synchronizing signal SYNC becomes low level "0". It is detected whether or not the composite synchronizing signal SYNC has become higher "1", within the period of the window signal.

Next, operation of the vertical synchronizing separating circuit 48 will be described with reference to Fig. 5A to FIG. 5J.

The composite synchronizing signal SYNC applied to the line a is supplied through the Schmidt circuit 71 to the AND circuit 76 and flip-flop 72. At time $t_1$, the flip-flop 72 is set with the falling edge of the horizontal synchronizing signal HD of the composite synchronizing signal SYNC. The Q output of the flip-flop 72 becomes "1" (line b), and so the AND circuit 77 is opened for the clock pulses applied to the input terminal 82. The clock pulses are counted by the counter 73. They are supplied from, for example, the reference oscillator 15 of FIG. 1. For example, the frequency of the clock pulses is 1 MHz.

The output c of the third bit of the counter 73 and the output d of the fourth bit of the counter 73 are applied to the inverters 79 and 80, respectively, and they are inverted thereby. The inverted outputs are supplied to the AND circuit 75. The output f of the AND circuit 75 is supplied through the OR circuit 81 to the inverter 80, and it is inverted thereby. The inverted output g is the window signal, and it is supplied to the AND circuit 76.

However, when there is no noise in the composite synchronizing signal SYNC until the following horizontal synchronizing signal HD or the equalizing pulse EQ, or when the composite synchronizing signal SYNC is maintained at the high level "1" until the following horizontal synchronizing signal HD or the equalizing pulse EQ, the window signal $\bar{g}$ is not opened, and is maintained at a low level "0".

When the horizontal synchronizing signal HD of the composite synchronizing signal SYNC is supplied to the Schmidt circuit 71 at time $t_1$, the counter 73 counts the clock pulses, and generates the output c at the third bit. The output of the inverter 79 falls down, and the output f of the AND circuit 75 rises up, and the output g of the inverter 80 rises up. The output g of the inverter 80 and the level "1" of the composite synchronizing signal SYNC following the horizontal synchronizing signal HD are supplied to the AND circuit 76. The output h of the AND circuit 76 rises up. The flip-flop 72 is reset with the output h of the AND circuit 76. The Q output b of the flip-flop 72 becomes "0". Accordingly, the AND circuit 77 is closed for the clock pulses supplied to the input terminal 82. As a result, the sindow signal $\bar{g}$ is not opened, and it is maintained at the low level "0" till the following horizontal synchronizing signal HD or the equalizing pulse EQ. The flip-flop 72 is set and reset whenever the horizontal synchronizing signal HD or the equalizing pulse EQ is supplied to the input terminal 70. At time $t_2$, the vertical synchronizing signal VDo arrives, and the composite synchronizing signal SYNC becomes "0", the flip-flop 72 is set. The counter 73 starts to count the clock pulses. Since the composite synchronizing signal SYNC is maintained at the low level "0", the AND circuit 76 is not opened, and the counter 73 continues to count the clock pulses. The outputs of the counter 73 becomes "1" in order at the third bit, fourth bit and fifth bit. As a result, the window signal g is opened as shown in FIG. 5H, with a window period of the level "1". The equalizing pulse PQ' of the vertical synchronizing signal VDo is not included in the window period of the window signal g. The flip-flop 72 is not reset with the equalizing pulse EQ' which is a positive pulse. The trailing edges of the window signals g are counted by the mod-4 counter 74. When four of them have been counted by the counter 74, the vertical synchronizing signal VD is obtained on the line i from the counter 74. Due to the fact that the composite synchronizing signal SYNC is at the low level "0" during the four window periods of the window signals g, a period including the four window periods is considered to be the period of the vertical synchronizing signal VDo from which the vertical synchronizing signal VD is taken. After the end of the period of the vertical synchronizing signal VDo, the same operation is repeated as during the time $t_1$ to $t_2$.

When the negative noise N as shown by the dotted line in FIG. 5A occurs in the composite synchronizing signal SYNC during time $t_1$ or $t_2$, the same operation is effected as for the horizontal synchronizing signal HD or the equalizing pulse EQ. The flip-flop 72 is set and reset in a very short time. The window signal g is not opened. When negative noise N occurs for a considerable time, the window signal g is opened correspondingly. However, if the considerable time is shorter than the four window periods of the window signals g, it is not considered to be the period of the vertical synchronizing signal VDo.

When positive noise occurs during the period of the vertical synchronizing signal VDo, there is concern that the vertical synchronizing signal VD will not be taken out. To overcome this concern, a self-excited type vertical synchronizing signal oscillator may be connected to the mod-4 counter 74.

In the vertical synchronizing separating circuit of this invention, the window signal is formed on the basis of the rising edge or falling edge of the composite synchronizing signal (for example, during the times $t_1$ and $t_2$), and it has the predetermined window period during which it is maintained at a predetermined level (for example, level "1"). The level change of the composite synchronizing signal is detected in at least one of the window periods of the window signals. When the level change is not detected, an output (for example, vertical synchronizing signal VD) is obtained.

Accordingly, the vertical synchronizing separating circuit of this invention may be constituted by an entirely digital circuit without capacitors, as shown in FIG. 4, and so it can be formed in Integration Circuit technique. Particulary, it is effective against wide noise, and is secure and accurate in operation.

Next, there will be described the example of the frame detecting circuit 47 with reference to FIG. 4.

The framing circuit 47 consists of a framing pulse forming circuit 90 and a noise inhibition circuit 91. The framing pulse forming circuit 90 includes a differential circuit 94 constituted by inverters 911, 92 and an exclusive logic sum circuit 93, a flip-flop 95, an AND circuit 96, a counter 97, a decoder 98, a counter 99, an AND circuit 100, and another differential circuit 104 constituted by inverters 101, 102 and an exclusive logic sum circuit 103 connected as shown. Clock pulses of, for example, 1 MHz are supplied to the counters 97 and 99 through an input terminal 105, for example, from the reference oscillator 15 of FIG. 1. The noise inhibition circuit 91 includes a flip-flop 106, AND circuits 107, 108, a counter 109, a decoder 110, an OR circuit 111 and an output terminal 112.

Next, there will be described operation of the framing pulse forming circuit 90 with reference to FIG. 6.

It is assumed that the composite synchronizing signal SYNC of the odd field is supplied to the input terminal 70. As shown in FIG. 6, the composite synchronizing signal SYNC includes a horizontal synchronizing signal HD, a vertical synchronizing signal VDo and equalizing pulses EQ, EQ'. As above described, the composite synchronizing signal SYNC is supplied to the vertical synchronizing separating circuit 48 to remove the vertical synchronizing signal VD which represents the predetermined position within the period of the vertical synchronizing signal VDo.

Further, the composite synchronizing signal SYNC is supplied to the differential circuit 94 which differentiates it. The differential pulse as shown in FIG. 6 is supplied to the AND circuit 96 and the flip flop 95. The latter is reset with the trailing edge of the differential pulse. When the differential pulse rises, the $Q_1$ output of the flip-flop 95 is at high level "1". The differential pulse passes through the AND circuit 96 to the counter 97 to reset it. Then, the $Q_1$ output of the flip-flop 95 becomes low with the trailing edge of the differential pulse. The counter 97 starts to count the clock pulses with the reset. The counted value of the counter 97 is decoded by the decoder 96. The decoder 98 generates an output to set the flip-flop 95 at the time when the counter 97 has counted the number of the clock pulses corresponding to the period of $\frac{3}{4}$H (H: Horizontal scanning period). The $Q_1$ output of the flip-flop 95 becomes high "1". As the result, the counter 97 is reset on every rising edge of the horizontal synchronizing signal of the composite synchronizing signal SYNC. Such operation is repeated until time $t_1$. The decoder 98 is designed so as to generate another output at the time when the counter 97 has counted the number of the clock pulses corresponding to the period of 6/5H. However, the other output corresponding to 6/5H is not generated until time $t_1$. The period of the vertical synchronizing signal VDo occurs in the time of 1H after the counter 97 is reset with the rising edge of the composite synchronizing signal SYNC at the time $t_1$. Accordingly, the counter 97 is not reset for the time of about 1.5H extending from the $t_1$ to the rising edge of the first equalizing signal EQ' in the vertical synchronizing signal VDo. As a result, the decoder 98 generates the other output after the time of 6/5H from the time $t_1$. Thus output is not obtained in the composite synchronizing signal of the odd field. In the odd field, the horizontal synchronizing signal HD of the composite synchronizing signal SYNC is shifted by the time of $\frac{1}{2}$H, as shown by the dotted line in FIG. 6, from the horizontal synchronizing signal HD of the composite synchronizing signal SYNC of the even field. Accordingly, the reset time of the counter 97 and the time corresponding to the time $t_1$ as shown in FIG. 6 are shifted by the time of $\frac{1}{2}$H, relative to the reset time and time $t_1$ of the even field. As the result, the counter 97 is reset at the intervals of 1H also in the period of the vertical synchronizing signal VDo. However, the output for 6/5H is obtained from the decoder 98 with the last equalizing pulse EQ'both in the odd field and in the even field.

Figure 6:
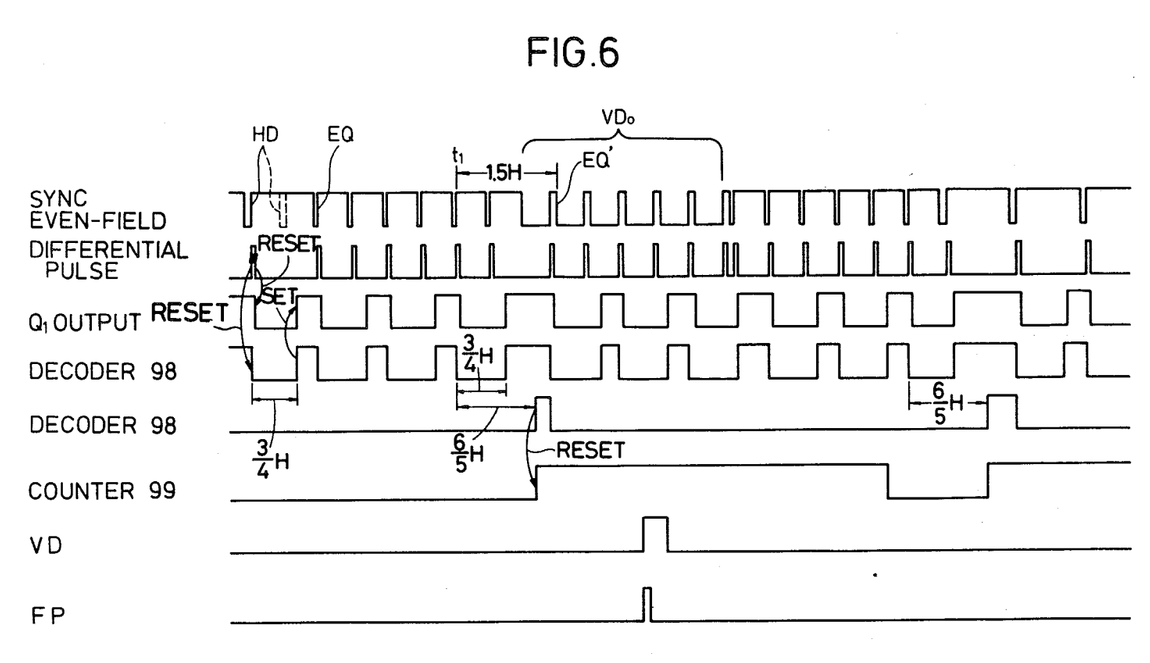

The counter 99 is reset with the first output of 6/5H from the decoder 99, which is a frequency-dividing counter for delay, and its output is maintained at high level "1" until it counts a predetermined number of the clock pulses from the reset, as shown in FIG. 6. The output of the counter 99 and the vertical synchronizing signal VD from the vertical synchronizing separating circuit 48 are supplied to the AND circuit 100. The output of the AND circuit 100 is differentiated by the differential circuit 104 to obtain a framing pulse FP.

The framing pulse FP is normally obtained in the even field every frame. However, when noise occurs in the composite synchronizing signal SYNC, or when one or more pulses of the horizontal synchronizing signal HD and equalizing pulses EQ are lost in the composite synchronizing signal SYNC, there is concern that the framing pulse FP will be generated at an erroneous position or in the odd field, or that it will not be generated. In order to avoid these problems, the framing pulse FP from the framing pulse forming circuit 90 is supplied to the noise inhibition circuit 91 to eliminate the influence of the noise. Next, there will be described operation of the noise inhibition circuit 91 with reference to FIG. 7.

Figure 7:
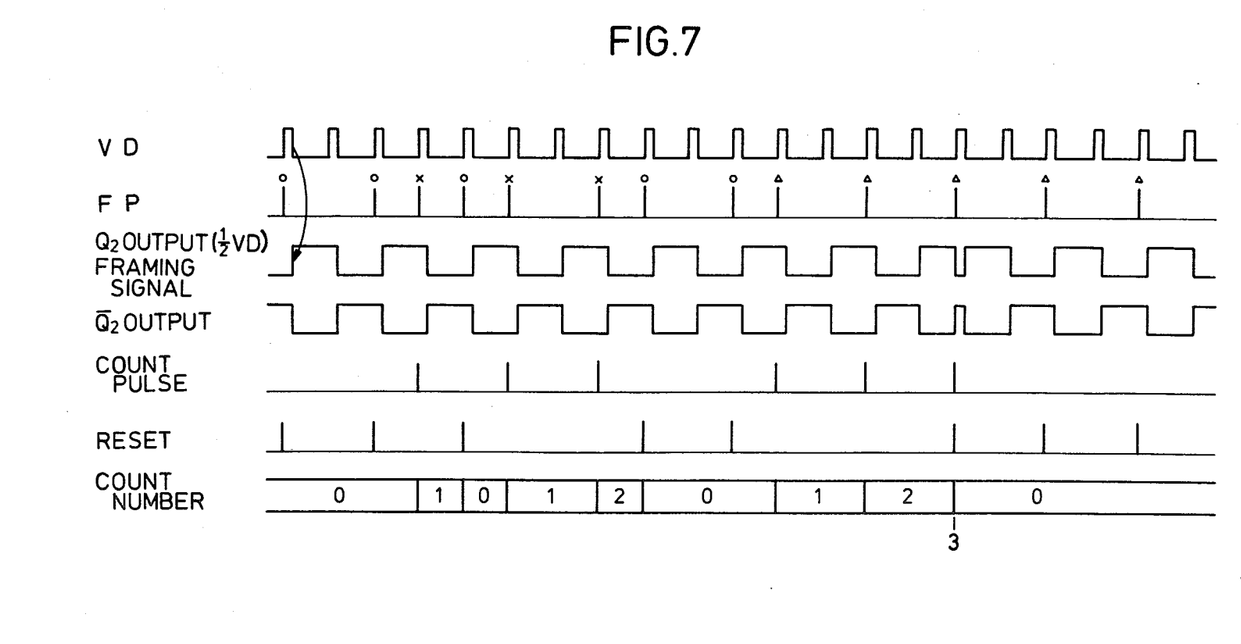

The flip-flop 106 is triggered with the trailing edge of the vertical synchronizing signal VD to generate $Q_2$ output as a framing signal. The frequency of the framing signal is half of that of the vertical synchronizing signal VD, and the framing signal has a predetermined phase in the predetermined field. In FIG. 7, right framing pulses FP obtained in the even field are indicated by o, and erroneous framing pulses FP generated at erroneous positions are indicated by x. Framing pulses FP indicated by Δ represent ones obtained in the case when video signals of even fields are successively supplied to the VTR, for example, at the connection point in the assemble edit operation.

The $Q_2$ output of the flip-flop 106 triggered with the trailing edge of the vertical synchronizing signal VD, and the framing pulse FD are supplied to the AND circuit 107, and the $Q_2$ output of the flip-flop 106, and the framing pulse FP are supplied to the AND circuit 108. The output of the AND circuit 108 is supplied through the OR circuit 111 to the flip-flop 106 and the counter 109 to reset them. When the right framing pulses FP are supplied to the AND circuits 107 and 108, the $Q_2$ output of the flip-flop 109 is at low level "0", as shown in FIG. 7. Accordingly, so long as the right framing pulses FP indicated by o are supplied to the AND circuits 107 and 108, the flip-flop 106 gererates the framing signal of half the frequency of the vertical synchronizing signal VD regardless of the reset signals. The framing signal is taken out through a switching circuit 83 from an output terminal. When the framing pulse FP indicated by x is supplied to the AND circuits 107 and 108, the output of the AND circuit 107 is supplied to the clock terminal of the counter 109 and counted thereby. However, the following framing pulse FP indicated by o and the $Q_2$ output of the flip-flop 106 are supplied to the AND circuit 108, and the counter 109 is reset with the output of the AND circuit 108. The frequency of the $Q_2$ output of the flip-flop 106 is maintained to be half of the frequency of the vertical synchronizing signal VD. When two of the erroneous framing pulses indicated by x are successively supplied to the AND circuits 107 and 108, the counter 109 counts "2", and then it is reset. The $Q_2$ output of the flip-flop 106 is not disturbed by the erroneous framing pulses FP. When the framing pulses FP indicated by Δ are successively supplied to the AND circuit 107 and 108, the counter 109 counts "3", and then it is reset with the output of the decoder 110. Concurrently, the flip-flop 106 is reset to invert the $Q_2$ output and $\overline{Q_2}$ output. It is considered that the framing pulses FP indicated by Δ are not erroneous, and that the phase of the frame is inverted. Correspondingly, the framing signal of half the frequency of the vertical synchronizing signal VD is obtained from the output terminal 112.

In the above-described framing detecting circuit, the level of the composite synchronizing signal SYNC is detected at the time of about ½H to about 1H (for example, ¾H) from the leading edge or trailing edge of the composite synchronizing signal, and the framing pulse is obtained at the time when the above-described level is inverted.

Further, the output of the flip-flop triggered with the vertical synchronizing signal and the framing pulse are compared in phase with each other. The flip-flop is reset at the time when, the number of times which the output of the flip-flop and the framing pulse are not coincident in phase with each other, has reached the predetermined number N.

Accordingly, the framing detecting circuit of this invention can be constituted by a pure digital circuit without capacitors. The above-described predetermined number N can be determined such as "3" by the counter and the accuracy can be improved.

When the framing detection is not required, the output of the vertical synchronizing separating circuit 48 is taken from the switching circuit 83 which is changed over by a control signal supplied to an input terminal 113, from the output terminal 112.

While this invention is illustrated with specific embodiment, it will be recognized by those skilled in the art that modifications may be made therein without departing from the true scope of the invention as defined by the following claims.

We claim as our invention:

1. A circuit for generating a vertical synchronizing pulse comprising, a first flip-flop circuit which receives an incoming composite sync signal including horizontal and vertical sync signals and equilizing pulses, a first multibit counter, a first AND gate receiving the output of said first flip-flop circuit and an incoming clock signal and supplying an input to said first multibit counter, a logic circuit receiving multiple outputs of said multibit counter and producing a window signal, a second multibit counter, a second AND gate receiving the output of said logic circuit and said incoming composite sync signal and supplying a reset pulse to said first and second multibit counters, and said second multibit counter receiving an input from said first multibit counter and producing said vertical sync pulse.

2. A circuit according to claim 1 wherein said logic circuit includes a third AND gate and an OR gate.

3. A circuit according to claim 2 wherein said logic circuit also includes first, second and third inverters.

4. A circuit according to claim 1 wherein said second multibit counter is a four bit counter.

5. A circuit according to claim 1 for generating a framing signal comprising a second flip-flop receiving said vertical sync pulse from said second multibit counter and with a first output comprising said framing signal, a first differential circuit receiving said incoming composite sync signal, a third flip-flop receiving the output of said first differential circuit, third and fourth counters receiving incoming clock signals, a fourth AND gate receiving inputs from said first differential circuit and said third flip-flop and supplying a reset signal to said third counter, a decoder receiving the output of said third counter and supplying outputs to said fourth counter and to said third flip-flop, a fifth AND gate receiving the output of said fourth counter and said vertical sync pulse, a second differential circuit receiving the output of said fifth AND gate, and a noise inhibiting circuit connected to the output of said second differential circuit and supplying a reset signal to said second flip-flop.

6. A circuit according to claim 5 wherein said noise inhibiting circuit comprises sixth and seventh AND gates which receive inputs from said second flip-flop and said second differential circuit, a fifth counter connected to receive the output of said sixth AND gate, a second decoder connected to the output of said fifth counter, and a second OR gate connected to receive the outputs of said seventh AND gate and said second decoder and to supply an output to reset said second flip-flop.

* * * * *